United States Patent [19]

Carlson

[11] Patent Number: 5,134,646
[45] Date of Patent: Jul. 28, 1992

[54] VOICE MESSAGING METHOD AND APPARATUS FOR PAY PHONE TELEPHONE SYSTEMS

[75] Inventor: Shaun E. Carlson, Mendham, N.J.
[73] Assignee: Unisys Corporation, Blue Bell, Pa.
[21] Appl. No.: 619,809
[22] Filed: Nov. 27, 1990

Related U.S. Application Data

[63] Continuation of Ser. No. 350,380, May 11, 1989, abandoned.

[51] Int. Cl.$^5$ ............... H04M 3/50; H04M 17/00
[52] U.S. Cl. .................................. 379/67; 379/89; 379/145; 379/146
[58] Field of Search ............ 379/67, 88, 89, 77, 379/84, 85, 211, 212, 214, 123, 143, 145, 146

[56] References Cited

U.S. PATENT DOCUMENTS

| | | | |
|---|---|---|---|
| 4,766,604 | 8/1988 | Axberg | 379/67 |
| 4,792,967 | 12/1988 | Ladd et al. | 379/67 |
| 4,811,382 | 3/1989 | Sleevi | 379/67 |
| 4,825,460 | 4/1989 | Carter et al. | 379/67 |
| 4,901,341 | 2/1990 | Carter et al. | 379/67 |

Primary Examiner—Thomas W. Brown
Attorney, Agent, or Firm—Albert B. Cooper; Mark T. Starr

[57] ABSTRACT

A voice message system for a pay phone telephone network interposes an Intercept Processing Subsystem (IPS) in the line connections between the pay telephones and the central office. A Voice Processing Subsystem (VPS) is connected to the central office switch by a trunk. A caller at a pay station enters a called telephone number which is stored in the "IPS". The Intercept Processing Subsystem monitors the line connection to determine if the called telephone remains on-hook for a predetermined number of ring tones or is busy for a predetermined number of busy tones. If the ring no answer or busy condition maintains, the "IPS" reduces the volume of the ring or busy tones on the line connection and superimposes a voice announcement thereon offering the voice message service to the caller. If the caller enters an acceptance key sequence or coin deposit, the "IPS" splits the line connection, sends a Thank You message to the calling telephone and speed dials the "VPS". When the "VPS" answers, the "IPS" sends a voice prompt to the calling telephone explaining that at the tone a voice message may be entered and delivery thereof will be attempted at predetermined intervals for a predetermined time. Simultaneously with sending the voice prompt to the caller, the "IPS" transmits the call parameters to the "VPS" utilizing a protocol with interleaved validity acknowledgement signals from the "VPS". If the transmission of the call parameters is valid, the "IPS" reestablishes the line connection beteen the calling telephone and the central office switch and the voice message from the caller is passed through the "IPS" to the "VPS" for recording thereat for subsequent delivery to the called station.

34 Claims, 8 Drawing Sheets

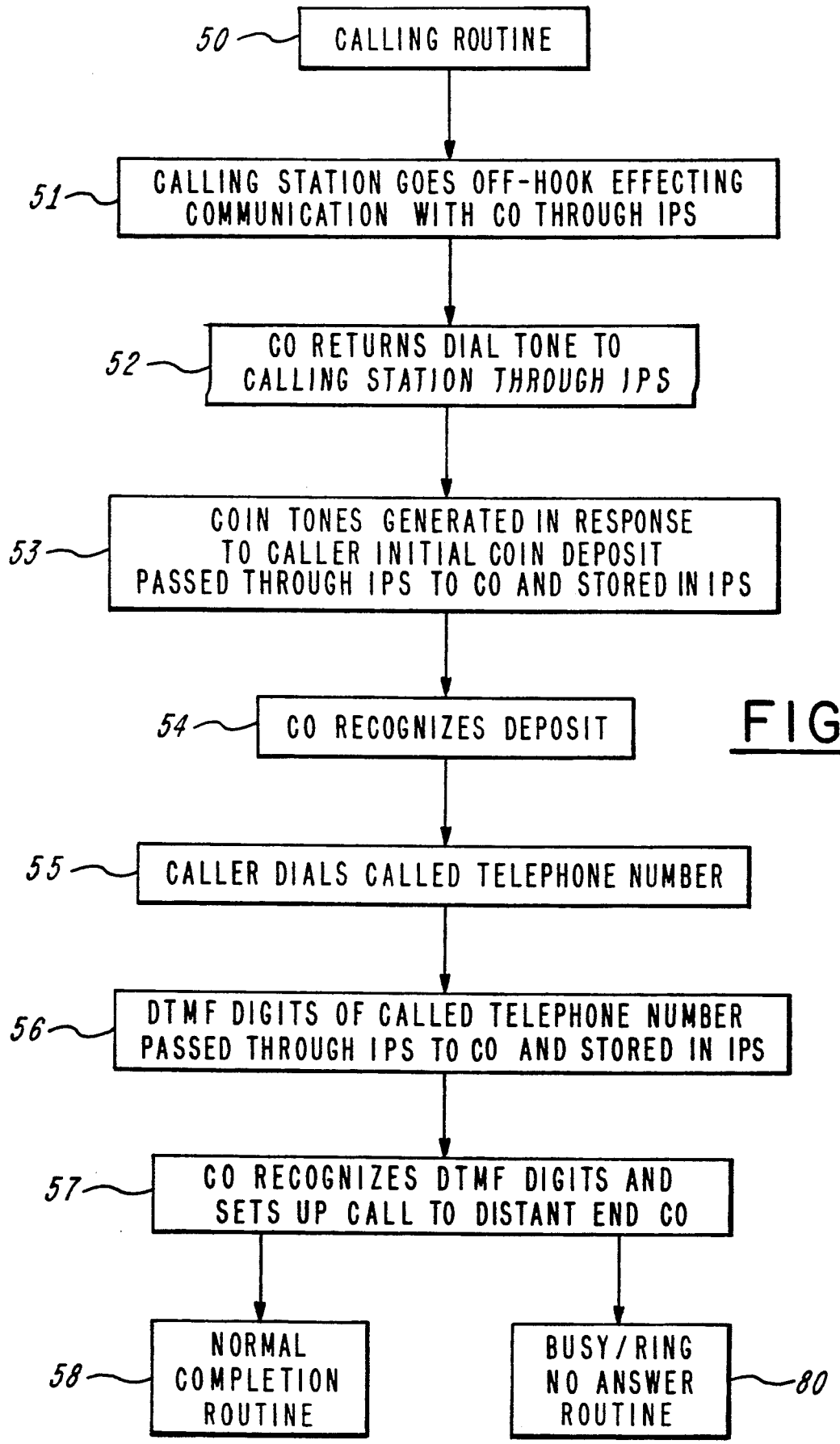

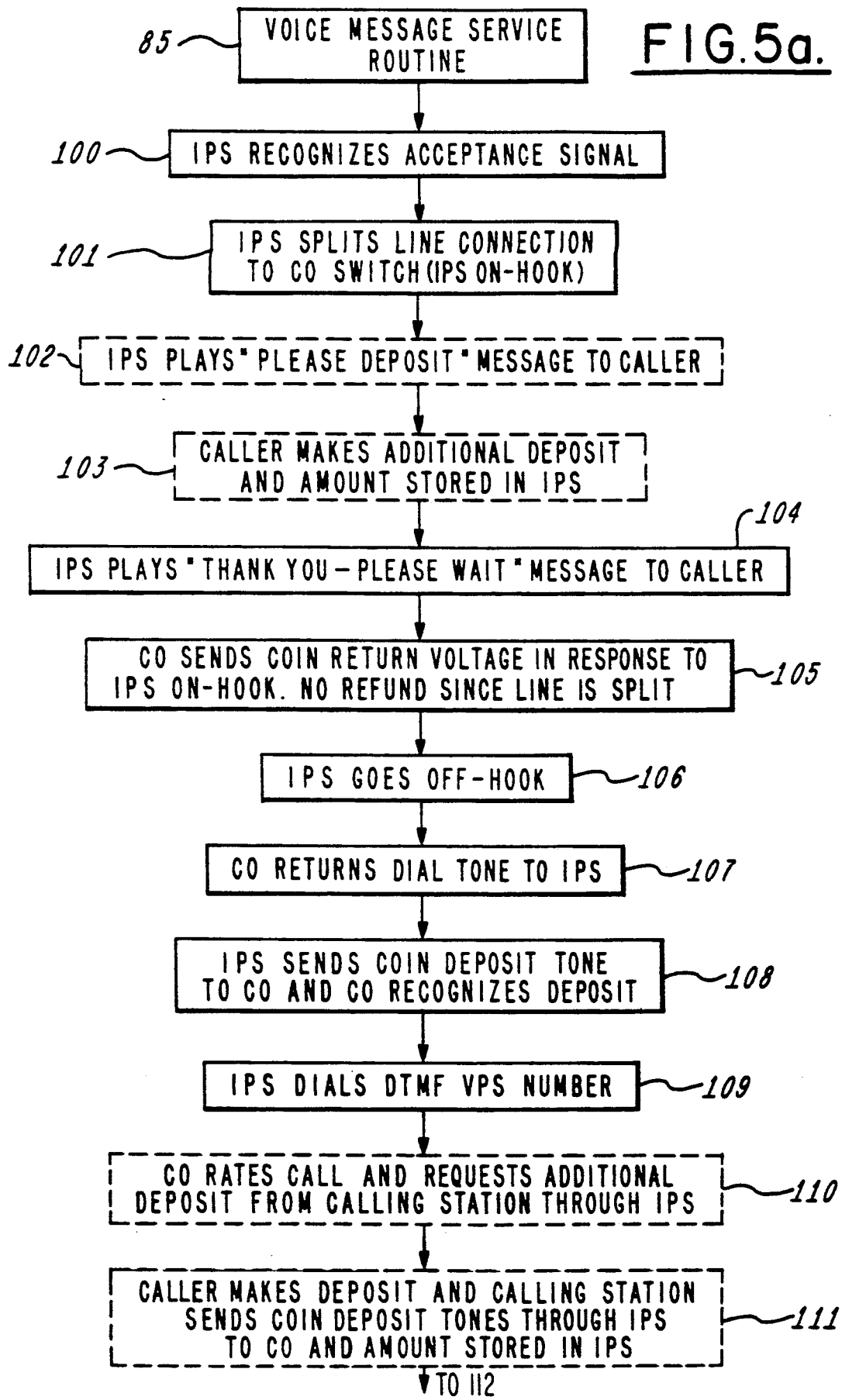

VOICE MESSAGING METHOD AND APPARATUS FOR PAY PHONE TELEPHONE SYSTEMS

This is a continuation of copending application Ser. No. 07/350,380 filed on May 11, 1989, now abandoned.

BACKGROUND OF THE INVENTION

1. Field of the Invention

The invention relates to telephone communication systems, particularly with respect to voice messaging systems for pay phone networks.

2. Description of the Prior Art

Voice messaging systems are generally known in the art and have various applications. For example, systems are available for use in premises environments such as networks for single buildings or campus environments such as complexes involving multiple buildings. Such systems capture the calling line when a busy signal or a predetermined number of unanswered rings are detected (Busy/RNA (Ring No Answer)). The system then provides a sequence of voice prompts to the caller that, inter alia, instructs the caller to re-key the number and to depress one or more keys for verification purposes. The calling party is then prompted by the system to leave a brief message for the called party. The system thereafter delivers the stored message in accordance with system protocol.

Another system currently in limited experimental use in pay telephone networks involves an appropriate voice prompt followed by a return of the deposited coinage to the caller in response to a Busy/RNA condition after the caller goes on-hook. The caller then redeposits appropriate coinage and dials a toll free number to connect with the voice messaging system. The system prompts the caller to re-key the called number and to leave a voice message to be later delivered to the called party by the voice messaging system when the Busy/RNA condition is no longer in effect.

Still another voice messaging system is disclosed in U.S. Pat. No. 4,766,604, issued Aug. 23, 1988. The system of said U.S. Pat. No. 4,766,604 is designed for use in a multiple pay station telephone installation operated from a central office. The system is predicated on pay stations that include microprocessors and associated memory for supporting various computer programs. Such telephones are often referred to as "smart" pay stations. The system of said U.S. Pat. No. 4,766,604 stores the called telephone number at the calling pay station. In response to a Busy/RNA condition, the system defaults to a routine that disables the handset, disconnects the original call from the trunk and dials a voice message center. The voice message center then prompts the caller with a message requesting the caller to accept or reject the service. If the caller accepts the service, the deposited coinage is collected and the called number is transmitted to the voice message center along with a security code. The voice message center performs a validity test on the code and if the test is failed, the caller is disconnected. If the calling pay station is valid, the voice message center issues a prompt to the calling party for the voice message and the caller leaves the message for later delivery to the called party.

It is a desideratum in the telecommunication art to ubiquitously provide voice messaging system service on pay station networks. None of the available prior art systems are entirely satisfactory for this purpose. The above-described premises and campus environment system requires a lengthy, time consuming protocol involving re-keying the number. Such systems would tend to usurp an undesirable amount of time when accessed from a pay phone thereby significantly reducing the revenue that the pay station is otherwise capable of collecting. Additionally, it is believed that re-keying the called telephone number may engender annoyance on the part of the pay phone caller which in turn may cause ill will with respect to the regional, national or international pay station network operating companies that may be using the system. The experimental pay station network voice messaging system described above also suffers from the requirement of telephone number re-keying with the attendant disadvantages as described. In addition, this system further requires return and redepositing of coinage further exacerbating the disadvantages of the prior art.

The system of said U.S. Pat. No. 4,766,604 requires the use of smart pay stations which currently have only experienced limited installation. The system of the patent cannot be utilized over the telephone company networks servicing the vast majority of "dumb" pay stations which number in the tens of millions. Utilization of the system of the patent would require that each dumb pay station from which such service is desired be retrofitted with a microprocessor and associated memory. The retrofitting may also require an additional line to be installed. Such retrofitting would be prohibitively expensive in that a cost of approximately $800.00 per retrofit may be required. Additionally, the system of said patent disables the handset and disconnects the call from the trunk in response to a Busy/RNA condition. Since, at this point, the call is disconnected from the trunk, the called party ring is terminated preventing the called party from responding to the call. From this point of disconnect, 15 to 20 seconds are required to offer the voice messaging service to the caller via an appropriate prompt and for the caller to accept the service. During this time, the called party may go off-hook in response to the original ring signal but will now only hear a dial tone although the calling party still has the handset off-hook. This voice messaging system protocol may tend to engender annoyance and ill will on the part of the telephone company customers affected by the service.

The system of said U.S. Pat. No. 4,766,604 collects the deposited coinage immediately upon acceptance of the service. The system then transmits the called number and a security code to the voice message center. If the calling station is determined by the system to be invalid, the caller is disconnected. Since the coinage has already been collected, further annoyance and ill will may be engendered by customers endeavoring to utilize the system. In the system of said U.S. Pat. No. 4,766,604, the called number and the security code are transmitted to the voice message center but only the security code is validated. In systems of this type, credit or calling card information may also be transmitted. Since the system does not perform validation on the called number or on any credit or calling card number, incorrect data can be transmitted and processed. For example, the voice message center of said U.S. Pat. No. 4,766,604 may endeavor to leave messages for the wrong people at the wrong place or charge the wrong credit or calling card. Additionally, the system of said U.S. Pat. No. 4,766,604 sequentially performs the elements of the system protocol such as transmitting call parameters including the called number and a security code to the voice message center and thereafter issuing a prompt from the voice message center to the calling station advising the caller that a voice message may be submitted. This sequential performance of required functions usurps an undesirable amount of traffic time decreasing the revenue that the pay station may otherwise collect. It is further appreciated that the system of said U.S. Pat. No. 4,766,604 performs a substantial number of the elements of the system protocol before inquiring if the caller desires the service. When the caller rejects the service, a significant amount of traffic time has been wasted that could otherwise be utilized for revenue generation.

Although not necessarily part of the prior art, it is believed that other voice messaging systems currently under consideration transmit the call parameters to the voice message center after the calling party goes on-hook. This protocol occupies the resources thereby introducing unuseable dead space on the line of approximately seven seconds after each request for voice messaging service, which dead time would otherwise be useable by the pay station for generating revenue.

It is appreciated from the foregoing, that it is a desideratum in the telephone system art to provide an automatic, time efficient, fully verifying, easy to use, inexpensive voice messaging system for use over any pay station telephone network, including dumb pay stations or otherwise, without effecting any retrofit to the pay stations.

SUMMARY OF THE INVENTION

The above disadvantages of the prior art are obviated by a voice messaging service method for storing and delivering voice messages over a telephone system having a plurality of telephone stations serviced by one or more interconnected central offices. A called telephone number identifying a called station is entered at a calling station. The called telephone number is transmitted from the calling station to a central office via a line connection through an intercept processing subsystem remote from the telephone stations in order to initiate a call to the called station. The called telephone number is stored in the intercept processing subsystem. The intercept processing subsystem evaluates whether the called station remains on-hook for a predetermined number of rings or is busy. If the called station remains on-hook for the predetermined number of rings or is busy, the intercept processing subsystem determines if the caller has accepted the voice messaging service. If the caller has accepted the voice messaging service, the intercept processing subsystem splits the line connection between the calling station and the central office switch and then dials a voice processing subsystem to enable the caller to record a voice message thereat for subsequent delivery to the called station.

Preferably, when the call is established between the intercept processing subsystem and the voice processing subsystem, the intercept processing subsystem transmits the call parameters to the voice processing subsystem while sending a prompt to the calling station for the caller to record the voice message. The voice message from the caller at the calling station is passed through the intercept processing subsystem to the voice processing subsystem and recorded thereat.

The invention includes disposing the intercept processing subsystem in the line connections between the telephone stations and the central office switch for performing the described functions.

BRIEF DESCRIPTION OF THE DRAWINGS

FIG. 2 is a flow chart diagram illustrating part of the calling routine utilizing the method of the present invention.

FIGS. 5a and 5b together comprise a flow chart diagram illustrating the voice messaging service procedure utilized when the service in accordance with the present invention is accepted by the caller.

DESCRIPTION OF THE PREFERRED EMBODIMENT

Figure 1:
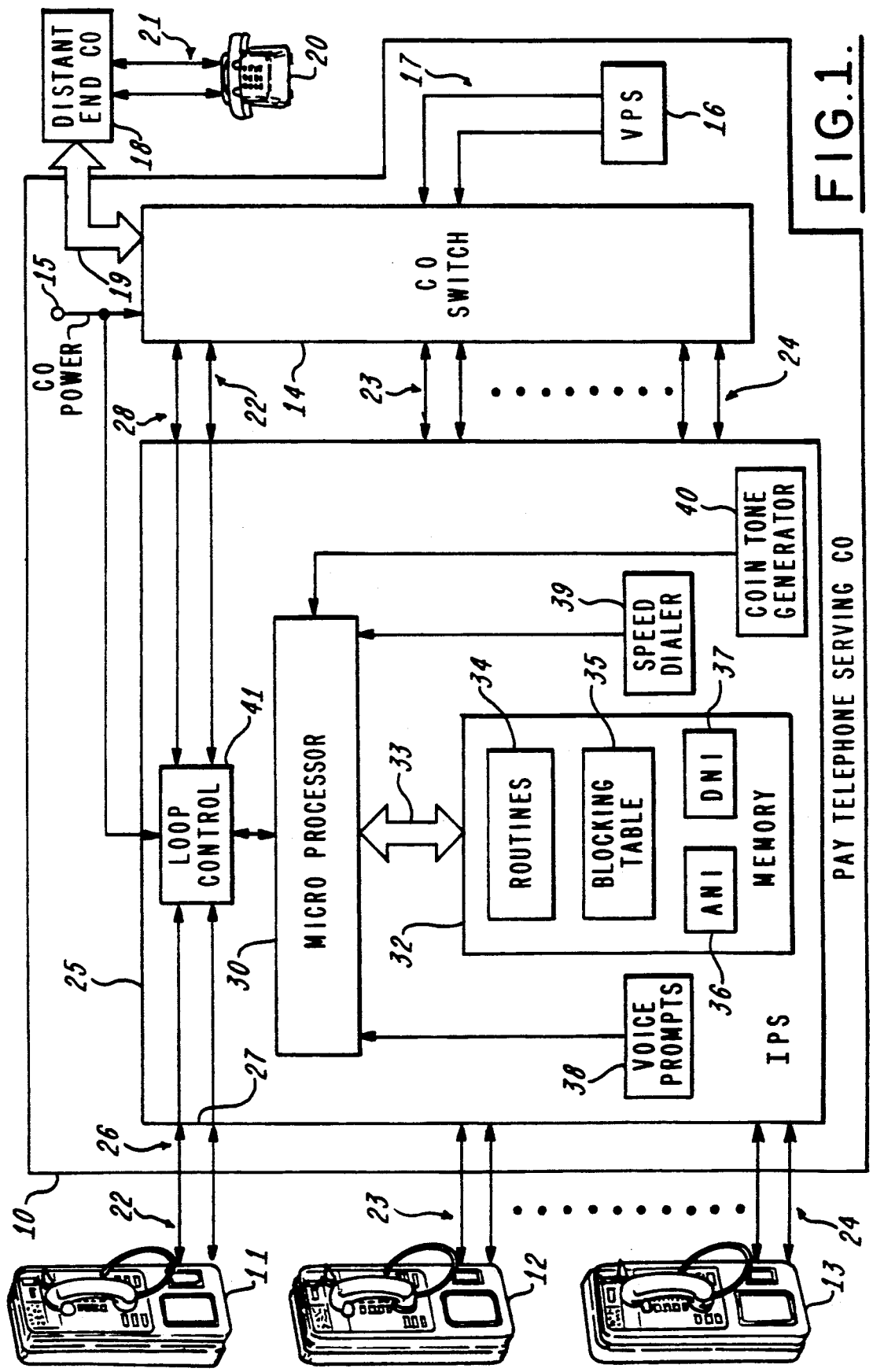
FIG. 1 is a schematic block diagram of a multiple station telephone system configured in accordance with the present invention.

Referring to FIG. 1, a schematic diagram of a telephone system including a pay telephone network is illustrated. A pay telephone serving central office (CO) 10 services a plurality of pay telephones 11-13. The CO 10 may be the central office of a telephone system regional operating company, such as a Regional Bell Operating Company (RBOC). The CO 10 includes a conventional CO switch 14 for receiving, routing, rating and otherwise processing telephone calls. The switch 14 receives conventional CO power as schematically represented at 15. The pay telephones 11-13 may, for example, be conventional Bell System instruments such as coin operated telephones and credit card responsive telephones. Such telephones are often referred to as "dumb" phones. The present invention is primarily configured to service dumb phones but could also be utilized with so-called "smart" phones as well as with non-pay phones such as subscriber residential and business telephones.

A Voice Processing Subsystem (VPS) 16 is located at the CO 10 for providing voice, store and forward functions in accordance with the system of the present invention. The VPS 16 is a commercially procurable system available from numerous sources. For example, Unisys Corporation of Blue Bell, Pa. provides a unit denoted as the Unisys Voice Processing Subsystem. The VPS 16 is available from Unisys Corporation in a personal computer (PC) version denoted as PC/Vips supported by a UNIX system host processor (UNIX is a trademark of AT&T). The PC/UNIX version of the VPS 16 is provided for entry level usage. Unisys Corporation also provides Network Applications Platform (NAP) with a resident application to support the VPS 16 functions as well as Intercept Processing Subsystem (IPS) functions to be later described. Numerous commercially procurable voice messaging systems are available for implementing the VPS 16. The VPS 16 is coupled to the CO switch 14 via a conventional loop or trunk connection 17.

The CO switch 14 from the CO 10 communicates with one or more distant end COs or trunk exchanges such as a distant end CO 18. The trunk connections between the switch 14 and the CO 18 are schematically represented at 19. A representative called telephone 20 is coupled to the CO 18 via a conventional line connection or loop 21.

Each of the pay telephones 11–13 is coupled to the CO 10, and particularly the CO switch 14, via a conventional line connection or loop 22, 23 and 24, respectively. In accordance with the present invention, an Intercept Processing Subsystem (IPS) 25 is interposed in each of the loops 22–24 between the telephones 11–13 and the CO switch 14. Preferably, the IPS 25 is located at the CO 10 but could be located at any other convenient site remote from the telephones 11–13 and interposed between the telephones 11–13 and the CO 10. The operation and interaction of the IPS 25, in accordance with the invention, with respect to the loop 22 is identical to the operation and interaction thereof with respect to the loops 23 and 24. The invention will be described with respect to the loop 22. In this regard, the loop 22 is comprised of a telephone side loop portion 26 extending from the telephone 11 to a loop input port 27 of the IPS 25 and a CO side loop portion 28 extending from the IPS 25 to the CO switch 14. It is appreciated that the IPS 25 services a predetermined number of the telephones served by the CO 10. The remaining pay phones are serviced by further IPS units configured in a manner identical to that described herein with respect to the IPS 25.

The functionality of the IPS 25 is performed and controlled by a microprocessor 30 included therein. The IPS unit 25 is described herein as concurrently performing functions with respect to the calling telephone 11 and with respect to the VPS unit 16 and the CO switch 14. Because of the high speed of present day microprocessors, sequentially programmed and executed functions are in effect simultaneously performed with respect to telephone system user real time. The microprocessor 30 may effectively perform concurrent functions with respect to the telephone 11 and with respect to the VPS 16 and the CO switch 14 by concurrency techniques such as interleaved instruction multitasking. Alternatively, dual microprocessors may be utilized for concurrently performing the functions.

The microprocessor 30 is coupled to a memory 32 via a bus 33. The memory 32 includes routines 34 to be performed by the microprocessor 30, in accordance with the present invention, in a manner to be described. The memory 32 also includes a blocking table 35 containing telephone numbers loaded by the user that are to be excluded from the voice messaging service.

The memory 32 further includes a conventional automatic number identification (ANI) function 36 as well as a conventional dialed number identification (DNI) function 37. As is well understood in the art, the ANI 36 effectively functions to capture the telephone number of the calling station. Data relative to the calling number is transmitted to the VPS 16. This function is performed by the microprocessor 30 storing the identification (ID) of the input port of the IPS 25 to which the calling telephone is connected. For example, if the serviced call is from the telephone station 11, the microprocessor 30 stores the ID of the input port 27 in the ANI 36. If the caller accepts the voice messaging service, the microprocessor 30 transmits the port ID from the ANI 36 to the VPS 16. The VPS 16 contains user supplied look-up tables that correlate the port IDs of the IPS units with the telephone numbers of the serviced stations. Similarly, the DNI 37 functions, in a well known manner, to capture the called telephone number entered at a calling station. For example, if a call is placed from the telephone station 11, the microprocessor 30 captures the called number and stores it in the DNI 37. Traditionally, the called number is in the form of DTMF (Dual Tone Multi-Frequency) digits. If service is accepted, the called DTMF digits are transmitted from the DNI 37 via the microprocessor 30 to the VPS 16, in a manner to be described.

The IPS 25 includes a voice prompt function 38 accessible by the microprocessor 30 for generating and delivering predetermined voice prompts and announcements to a calling telephone station, in a manner to be described. For example, if a call is placed from the telephone station 11, the microprocessor 30 utilizes the voice prompt function 38 to deliver appropriate voice announcements to the caller at the station 11 via the loop 26. The voice prompt function 38 may be implemented in any convenient manner by utilizing, for example, announcer or voice chip coders and the like.

The IPS 25 further includes a speed dialer 39 that is utilized by the microprocessor 30 for speed dialing the VPS 16 via the loop portion 28 and the CO switch 14. The speed dialer 39 dials one or more telephone numbers of the VPS 16 utilizing DTMF digits, in a manner to be further explained. The IPS 25 also includes a coin tone generator 40 utilized by the microprocessor 30 for sending conventional coin tones to the CO switch 14, in a manner and for reasons to be described.

Devices are well-known and available in the art for implementing the voice prompts 38, the speed dialer 39 and the coin tone generator 40. Such devices may be implemented to provide digital outputs and thus are directly connectable as inputs to the microprocessor 30, as illustrated.

The IPS 25 includes loop control circuit 41 responsive to the telephone side loop portion 26 and the CO side loop portion 28 of the loop 22 and to the CO power 15 for performing various functions with respect to the loop 22, in accordance with the present invention. The loop control circuit 41 is in two-way communication with and controlled by the microprocessor 30 to perform the functions as follows:

1. Under control of the microprocessor 30, the loop control circuit 41 forms a straight through connection between the loop portions 26 and 28 to complete the loop 22 between the telephone station 11 and the CO switch 14. The microprocessor 30 monitors the loop 22 with respect to busy tone signals, RNA signals, coin tone signals, capturing and storing credit and calling card numbers for non-sent paid calls, capturing and storing the called telephone number and, recognizing a service acceptance signal from the caller.

2. Under control of the microprocessor 30, the loop control circuit 41 reduces the signal level of the busy signal or the RNA signal on the loop 22 and the microprocessor 30 superimposes a predetermined voice announcement from the voice prompts function 38 on the loop 22 offering the voice messaging service to the caller, in a manner to be described.

3. Under control of the microprocessor 30, the loop control circuit 41 splits the line connection between the loop portions 26 and 28 thereby breaking the connection between the calling station 11 and the CO switch 14. The loop control circuit 41 is responsive to CO switch power 15 to maintain switch power to the calling station 11 via the loop portion 26 when the line connection is split.

4. While the line connection is split, the loop control circuit 41 maintains communication between the microprocessor 30 and the telephone station 11 via the loop portion 26 for providing predetermined voice prompts and announcements to the caller from the voice prompts function 38.

5. While the line connection is split, the loop control circuit 41 maintains communication between the microprocessor 30 and the loop portion 28 so that the microprocessor 30 can controllably effect an on-hook or off-hook condition with respect to the loop portion 28. The microprocessor 30 goes off-hook with respect to the loop portion 28 for transmitting coin deposit tones to the CO switch 14 utilizing the coin tone generator 40, for dialing the VPS 16 utilizing the speed dialer 39 and for passing call parameters to the VPS 16, in a manner to be described.

6. While the line connection is split, the loop control circuit 41 can re-establish the straight through connection between the loop portion 26 and the loop portion 28 under control of the microprocessor 30.

It is appreciated from the foregoing that the monitoring functions and the message superimposition functions performed by the microprocessor 30 with respect to the loop 22 by the loop control circuit 41 are performed in a well known manner by conventional bridge connections until service acceptance when the split connection is effected. The loop control circuit 41 includes standard telephone equipment relays implemented in combination with standard known devices in well-known configurations to perform the functions described. It is further appreciated that when the line connection is split by the loop control circuit 41, the IPS 25 appears to the telephone 11 as a CO switch and to the CO switch 14 as a calling telephone.

The present invention is applicable to sent paid telephone calls where the caller deposits coinage at the calling station as well as to non-sent paid telephone calls where the caller utilizes a credit or calling card. With respect to sent paid calls, the voice messaging service is paid for by the initial deposit of the caller and any additional deposit requested by the IPS 25 or the CO switch 14, in a manner to be described. For non-sent paid calls, the VPS 16 includes conventional credit and calling card rating and billing apparatus for billing the caller for the service. It is anticipated that in the present embodiment of the invention, each RBOC will include a voice processing subsystem such as the VPS 16 for providing the voice messaging service. It is appreciated that pay telephone calls placed within the area serviced by an RBOC require the same initial deposit. The invention is, however, also readily applicable to service that extends across RBOC boundaries. In other words, the invention applies to both local and long distance telephone service.

FIGS. 2-5 provide flow charts of the routines 34 utilized in performance of the invention. In the descriptions to follow of FIGS. 2-5, it is assumed that a caller places a telephone call at the pay station 11 to the telephone 20. The flow charts of FIGS. 2-5 are structured with respect to sent paid calls. The operations and functions appropriate to non-sent paid calls will be explained at the appropriate points in the description. Normally, the caller endeavoring to call the telephone 20 from the pay station 11 will experience one of three different call dispositions; viz, call completion, busy tone or RNA.

Referring to FIG. 2, a calling routine 50 is illustrated. During the quiescent on-hook condition of the telephone station 11, the microprocessor 30 controls the loop control circuit 41 to maintain the straight through connection between the loop portions 26 and 28. Pursuant to a block 51, when the calling station 11 goes off-hook, communication is effected with the CO switch 14 through the IPS 25 via the loop 22 with the microprocessor 30 monitoring the loop 22. Pursuant to a block 52, the CO switch 14 returns dial tone to the calling station 11 which passes through the IPS 25. For sent paid calls, the coin tones generated in response to the initial coin deposit of the caller are monitored by and passed through the IPS 25 to the CO switch 14 as indicated in a block 53 and, pursuant to a block 54, the CO switch 14 recognizes the deposit. The microprocessor 30 monitors the coin tones and stores the amount of the deposit in memory 32. For non-sent paid calls, conventional apparatus associated with the CO switch 14 validates and processes credit and calling card numbers in a well known manner. The microprocessor 30 also stores the card number in memory 32 for later transmission to the VPS 16 if voice messaging service is accepted.

At a block 55, the caller at the telephone station 11 dials the called telephone number. Pursuant to a block 56, the DTMF digits of the called telephone number pass through the IPS 25 to the CO switch 14. The microprocessor 30 monitors the loop 22 storing the dialed digits in memory 32. At a block 57, the CO switch 14 recognizes the DTMF digits of the called telephone number and sets up the call to the distant end CO 18. If the disposition of the call will be call completion, a normal completion routine 58 is followed.

Figure 3:
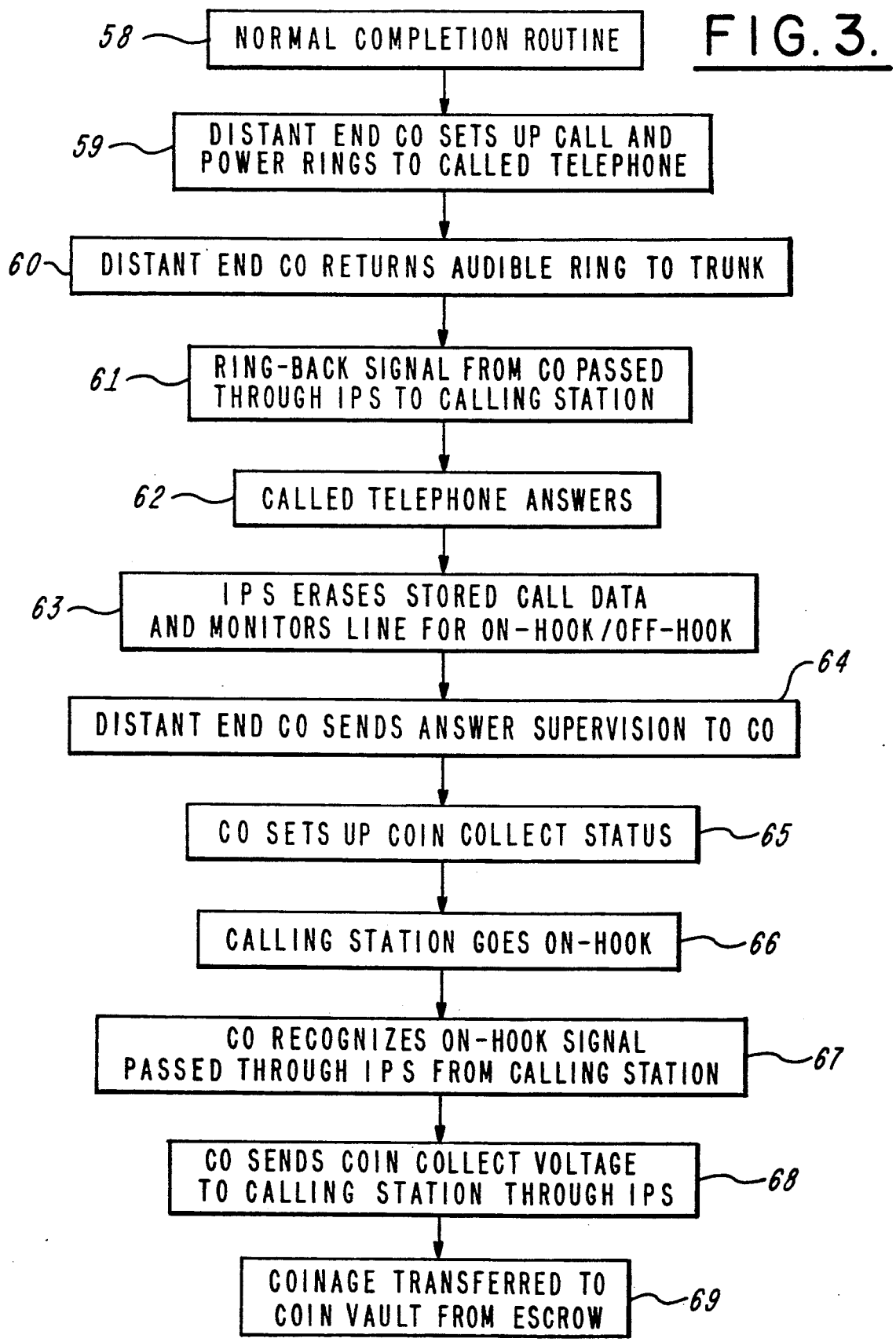
FIG. 3 is a flow chart diagram illustrating the normal completion procedure of the routine of FIG. 2 for a telephone call placed from a station of the system of FIG. 1.

Referring to FIG. 3, the normal completion routine 58 is illustrated. Pursuant to a block 59, the distant end CO 18 sets up the call to and power rings the called telephone 20. The distant end CO 18 returns an audible ring to the trunk 19 and the ring back signal from the CO switch 14 is passed through the IPS 25 to the calling station 11. It is appreciated that the microprocessor 30 is monitoring the loop 22 with respect to the ring back signal to detect an RNA condition or a call completion condition. These ring back procedures are depicted by blocks 60 and 61. It is appreciated that the microprocessor 30 recognizes the call completion condition by, for example, the termination of the ring back signal.

Pursuant to a block 62, the called telephone 20 answers. In response to this call completion condition, the microprocessor 30 erases the stored call data from the memory 32 pursuant to a block 63 and continues to monitor the loop 22 for the on-hook condition which will occur at the telephone station 11 when the call is terminated. Thus, when the caller at the station 11 receives an answer condition from the called party at the telephone 20, the IPS 25 will not activate message service with respect to the station 11 until a subsequent call is placed therefrom as detected by an on-hook/off-hook sequence.

When the called telephone 20 answers the call, the distant end CO 18 sends an answer supervision signal to the CO switch 14 in response to which the CO switch 14 sets up the coin collect status. Blocks 64 and 65 depict these operations. Pursuant to a block 66, the calling station 11 goes on-hook at the termination of the call. A block 67 depicts the recognition by the CO switch 14 of the on-hook signal which is passed through the IPS 25 from the calling station 11. In response to the on-hook signal, the CO switch 14 sends the coin collect voltage to the calling station 11 through the IPS 25 as depicted by a block 68. In response to the coin collect voltage, the telephone station 11 collects the deposited coinage by transferring the coins from the telephone station escrow chamber to the coin vault. Block 69 designates this operation.

Figure 4:
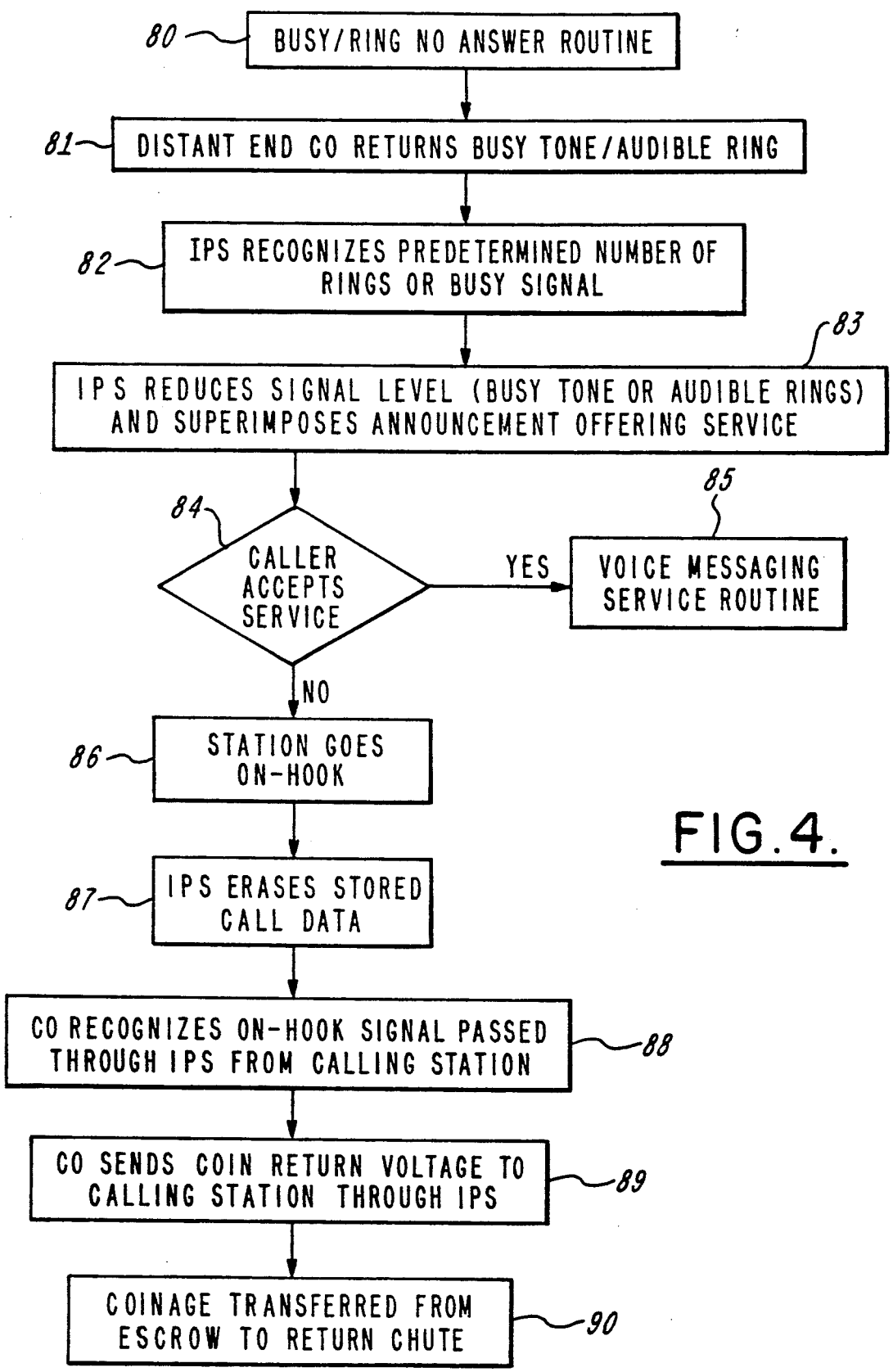
FIG. 4 is a flow chart diagram illustrating the "Busy/No Answer" path in accordance with the present invention for the calling routine of FIG. 2 when the call is not completed.

Referring for the moment back to the block 57 of FIG. 2, if the call disposition will be busy tone or RNA rather than normal call completion, a busy/RNA routine 80 is followed rather than the normal completion routine 58, described above. FIG. 4 illustrates the details of the busy/RNA routine 80.

Referring to FIG. 4, the distant end CO 18 returns a busy tone or an audible ring which is passed through the CO switch 14 and the IPS 25 to the calling telephone station 11. A block 81 denotes these operations with the microprocessor 30 controlling the loop control circuit 41 to maintain a straight through connection for the loop 22. Pursuant to a block 82, the microprocessor 30 monitors the loop 22 with respect to the busy or ring tones. The IPS 25 is programmed to recognize a predetermined number of ring tones or the busy signal to initiate offering the voice messaging service. It is appreciated that the service will not be provided for telephone numbers stored in the blocking table 35. In accordance with a block 83, after the IPS 25 recognizes the programmable number of ring tones or the busy signal, the microprocessor 30 controls the loop control circuit 41 to reduce the busy or ring tone level and superimposes a service availability announcement on the loop 22. The microprocessor 30 utilizes the appropriate preprogrammed announcement from the voice prompts function 38. The microprocessor 30 continues to monitor the loop 22 so that should the called party answer after the service availability announcement has begun and before the caller activates acceptance of the message service, the microprocessor 30 would control the loop control circuit 41 to resume normal volume level on the loop 22 and would not further effect message service until a subsequent call is placed from the pay station 11 as detected by an on-hook/off-hook sequence.

Alternatively, the present invention may be implemented in a system that does not utilize the operations of block 83 of FIG. 4. In such a system, the caller understands that the voice messaging service is available after a predetermined number of ring tones or busy tones and that the service may be invoked by an appropriate action such as a predetermined keypad sequence or the deposit of additional coinage.

If the caller accepts service pursuant to a block 84 (YES path), the IPS 25 immediately initiates message services pursuant to a voice messaging service routine 85. The voice messaging service may be invoked by, for example, a predetermined programmable key sequence or deposit of appropriate coinage. An appropriate service acceptance key sequence is "*7". Coin deposit is an appropriate service acceptance signal in the event of sent paid calls.

The caller rejects the voice messaging service, as depicted by the NO path from the block 84, by not performing the predetermined service acceptance action. For example, the caller rejects service by not keying in the predetermined acceptance key sequence. The caller then places the telephone 11 on-hook pursuant to a block 86. The IPS 25 continues to monitor the loop 22 for a subsequent off-hook condition and does not further effect message services until a subsequent call is placed from the pay station 11 as indicated by the on-hook/off-hook sequence.

In response to the station 11 going on-hook, the microprocessor 30, pursuant to a block 87, erases the data stored in the memory 32 pursuant to the attempted telephone call. Pursuant to a block 88, the CO switch 14 recognizes the on-hook signal passed through the IPS 25 from the calling station 11. Since the telephone call was not completed nor voice messaging service accepted, the CO switch 14 is set to transmit the coin return voltage to the trunk 22. Pursuant to blocks 89 and 90, the CO switch 14 sends the coin return voltage to the calling station 11 through the IPS 25 and in response thereto the coinage in the escrow chamber or hopper of the calling station 11 is transferred to the return chute thereof. If the caller accepts the voice messaging service pursuant to the YES path at the block 84, the IPS 25 enters the voice messaging service routine 85. The details of the voice messaging service routine 85 are illustrated in FIGS. 5a and 5b.

Figure 5B:
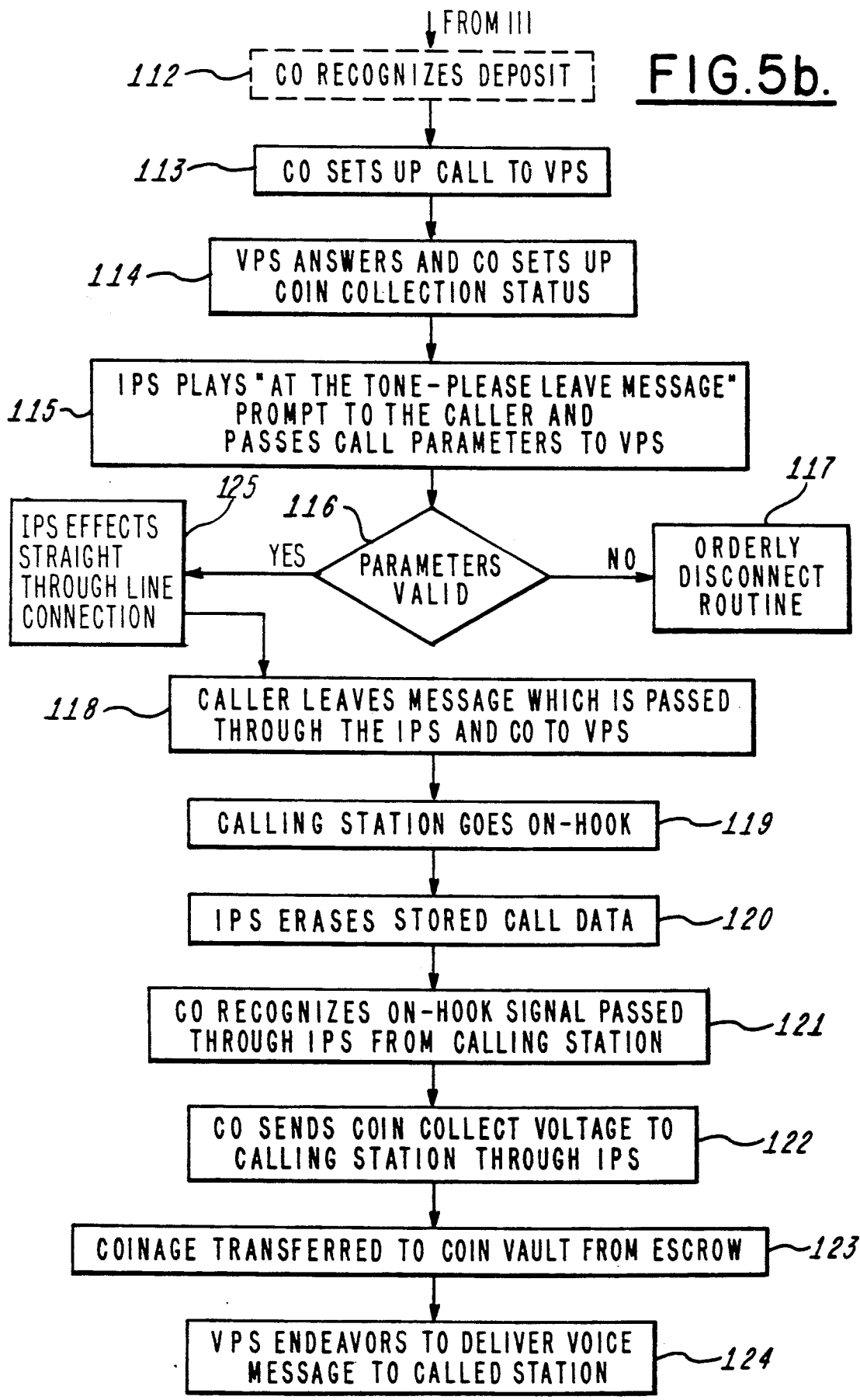

Referring to FIGS. 5a and 5b, when the caller accepts message service, the microprocessor 30 immediately recognizes the acceptance signal and controls the loop control circuit 41 to split the line connection 22 between the telephone 11 and the CO switch 14. These operations are depicted by blocks 100 and 101. Splitting the loop line connection 22 appears to the CO switch 14 as the telephone 11 going on-hook. Since at this point in the process, the CO switch 14 is set to return the coinage deposited by the caller, the return voltage placed on the loop 22 by the CO switch 14 in response to the on-hook condition is prevented, by the split, from reaching the pay station 11. Thus, the deposited coinage remains in the escrow chamber. The on-hook condition effected by the line connection split releases the communication path through the CO switch 14, the trunk 19, the distant end CO 18, the loop 21 and the telephone 20 that was set up pursuant to the attempted call.

The routines 34 and the voice messages stored in the voice prompts function 38 (FIG. 1) may be implemented to configure the IPS 25 in accordance with optional functionality. The IPS 25 may be configured so that the IPS 25 requests a deposit of additional coinage to pay for the voice messaging service or the IPS 25 may be configured so that the CO switch 14 requests the additional deposit. The IPS 25 that requests the additional deposit is denoted as an IPS-C unit and the IPS 25 that transmits the request of the CO switch 14 for additional deposit through to the telephone 11 is denoted as an IPS-S unit.

Pursuant to a block 102, when the IPS 25 is an IPS-C unit and the caller is endeavoring to place a sent paid call, the microprocessor 30, utilizing the voice prompts function 38, transmits a programmable message requiring an additional coinage deposit for the message service charge. In response to the request for additional coinage, the caller makes an additional deposit in accordance with a block 103 and the microprocessor 30 monitors the resulting coin tones on the loop portion 26 to detect that the additional service deposit has been satisfied. In addition, the microprocessor 30 adds the amount of the deposit to the amount of the initial deposit and stores the result in memory 32.

For both types of IPS units and sent and non-sent paid calls pursuant to a block 104, the microprocessor 30 transmits a programmable service announcement from the voice prompts function 38 to the telephone 11 such as "THANK YOU FOR USING THE VOICE MESSAGE SERVICE . . . YOUR REQUEST IS BEING PROCESSED". It is appreciated that when the IPS 25 is an IPS-C unit and the caller is endeavoring to place a sent paid call, the message of block 104 is transmitted after the message of block 102 is delivered and the service deposit has been satisfied.

Concurrent with the transmission by the microprocessor 30 to the telephone 11 of the announcements pursuant to the blocks 102 and 104, the microprocessor 30 is performing the operations to be described with respect to blocks 105-114. In other words, the voice announcements of the blocks 102 and 104 are intended as a "PLEASE STAND BY" tactic while the subsequent events of blocks 105-114 are executed.

The block 105 depicts the CO switch 14 sending the coin return voltage in response to the on-hook condition effected by the line split of the block 101. No refund is effected since the line is split. The block 106 depicts the microprocessor 30 effecting an off-hook condition with respect to the loop portion 28 and the block 107 depicts the receipt by the IPS 25 of dial tone from the CO switch 14 in response to the off-hook condition of the block 106. Pursuant to a block 108, the microprocessor 30 transmits programmable initial deposit coin tones, utilizing the coin tone generator 40, to the CO switch 14 and the CO switch 14 recognizes the deposit. The IPS 25 sends coin deposit tones to the CO switch 14 so that the switch will be set to provide the coin collect voltage after the caller has completed the voice messaging service. In the case of the IPS-C units, the coin tones are programmed to satisfy the CO switch 14 with respect to the charges that the switch expects for the call and the service. As described above with respect to the blocks 102 and 103, the IPS-C unit has requested the additional deposit for the service and the caller has made the deposit. With respect to the IPS-S unit, the coin deposit tones provided by the IPS 25 to the CO switch 14 are transmitted to satisfy the switch with respect to an initial deposit so that the switch will be set to the coin collect voltage. In a manner to be described, the CO switch 14 requests the additional service deposit when an IPS-S unit is utilized. In either case, the microprocessor 30 utilizes the coin tone generator 40 to transmit a burst of "nickel tones" to the CO switch 14 in order to effect the coin collect status thereof.

With respect to the blocks 109-112, the operations performed by an IPS-S unit differ from the operations performed by an IPS-C unit and will be separately described. Pursuant to the block 109, when the IPS 25 is an IPS-S unit, the microprocessor 30 dials programmable DTMF digits of a telephone number for the VPS 16 utilizing the speed dialer 39. The microprocessor 30 dials either a sent paid or non-sent paid VPS number depending upon the type of call. If the call is of the sent paid type, the block 110 is effected whereby the CO switch 14 rates the call and passes a request through the IPS 25 to the telephone 11 for any additional coinage required for the service. The CO switch 14 utilizes standard telephone company network call rating and billing apparatus such as switch routing, translation and charging tables and/or TSPS/TOPS. Pursuant to blocks 111-113, the caller effects the requested deposit and the calling station 11 transmits appropriate coin deposit tones through the IPS 25 to the CO switch 14. The microprocessor 30 also monitors the coin tones and adds the amount of the deposit to the initial deposit and stores the result in memory 32. The CO switch 14 recognizes the deposit and sets up the call to the VPS 16. When the IPS 25 dials the non-sent paid VPS number, the routing and charging tables of the CO switch 14 are set to permit the programmable VPS number dialed for credit or calling card calls to be passed through the rating process unaffected. This is because the VPS 16 is utilized to rate and bill non-sent paid calls in a conventional and well known manner.

It is appreciated that the line split effected pursuant to block 101 is maintained until the block 109 when the IPS 25 dials the VPS 16. For the blocks 110-112, the loop control circuit 41 is controlled by the microprocessor 30 to effect the straight through connection so that the additional deposit request from the CO switch 14 can be passed through the IPS 25 to the telephone 11 and the coin tones from the telephone 11 in response thereto that can be passed through the IPS 25 to the CO switch 14. Pursuant to the block 113, the line split condition is re-effected by the loop control circuit 41. Throughout these operations, the CO switch 14 continues to experience an off-hook condition. It is appreciated that the CO switch 14 is set to the coin collect status following the operations performed pursuant the blocks 110-112.

When the IPS 25 is an IPS-C unit, the blocks 110-112 are not utilized since the IPS-C unit requested the additional deposit for the service pursuant to block 102 rather than the CO switch 14. With respect to the block 109, the microprocessor 30, employing the speed dialer 39, calls the VPS 16 utilizing a programmable DTMF VPS number. In response to this number, the switch routing and charging tables of the CO switch 14 are set to permit the VPS number dialed to be passed through the rating process unaffected. For sent paid calls, all of the required coinage has already been deposited at the station 11. For non-sent paid calls, the VPS 16 utilizes standard rating and billing equipment to charge the appropriate credit and calling cards.

As discussed above with respect to blocks 109 and 113 for IPS-S and IPS-C units and for sent paid and non-sent paid calls, the IPS 25 calls the VPS 16 and the CO switch 14 sets up the call thereto. Pursuant to the block 114, if the VPS 16 answers, the CO switch 14 sets up the coin collection status and the IPS 25 is connected to the VPS 16.

If, however, the IPS 25 is unable to connect to the VPS 16 because of conditions such as busy tone, RNA or time out, the CO switch 14 reverts to the coin return voltage status and the microprocessor 30 controls the loop control circuit 41 to effect the straight through connection and transmits a programmable message to the caller at the telephone 11 utilizing the voice prompts function 38 to the effect "WE ARE UNABLE TO PROCESS YOUR REQUEST AT THIS TIME". The caller then goes on-hook and the IPS 25 passes the coin return voltage from the switch 14 to the telephone 11 returning the deposit of the caller. All message service from the IPS 25 to the telephone 11 is terminated until a subsequent call is placed from the pay station 11 as detected by the on-hook/off-hook sequence.

When a caller requests message service, as described above, the IPS 25 causes the call to be rerouted to the VPS 16. Normally, the VPS 16 answers and transmits to the IPS 25 a predetermined signal acknowledging the call. The predetermined signal may, for example, comprise a two character DTMF tone sequence selected from the keypad characters 0-9, *, and #, or from the telephone company private tones A–D. In the preferred embodiment of the invention, "BB" is transmitted as the VPS answer acknowledgement. It is appreciated at this point in the sequence that the loop 22 is split at the loop control circuit 41 with the microprocessor 30 communicating with the loop portions 26 and 28.

The microprocessor 30 recognizes the BB sequence and transmits to the telephone 11 utilizing the voice prompts function 38, a programmable service announcement to the effect:

"AT THE TONE YOU MAY LEAVE A 30 SECOND MESSAGE . . . WHEN YOU ARE FINISHED, PLEASE HANG UP. MESSAGE DELIVERY WILL BE ATTEMPTED EVERY 'X' MINUTES FOR THE NEXT 'N' HOURS".

The intent of the service announcement is a "PLEASE STAND BY" tactic while the microprocessor 30 transmits call parameters from the IPS 25 to the VPS 16. The playing of the service announcement and concurrent transmission of call parameters to the VPS 16 are denoted by a block 115. In the preferred embodiment of the invention, three sets of parameters are passed to the VPS 16 in accordance with a predetermined protocol to be later described with respect to FIG. 6. The parameters are as follows:

Calling IPS unit number
Password
Calling port number
Call type (sent paid or non-sent paid)
Call condition (busy or RNA)
Sent paid deposit
Called telephone number
Card number During the transmission of the call parameters from the IPS 25 to the VPS 16, the VPS 16 performs conventional verification tests thereon. For example, the VPS 16 determines if the password and IPS unit identification are appropriate. Pursuant to a block 116 (NO path), if any parameter fails verification, the VPS 16 notifies the IPS 25 to perform an orderly disconnect routine (block 117) by transmitting to the IPS 25 a predetermined invalidity signal. The invalidity signal may, for example, be a two character DTMF tone sequence. In the preferred embodiment of the invention, "DD" is utilized. In the orderly disconnect routine 117, the IPS unit 25 causes return voltage to be transmitted from the CO switch 14 to the telephone station 11 via the loop 22 by executing an on-hook/off-hook/on-hook sequence while preventing the originally set collect voltage from reaching the pay station 11 via a line-split.

Specifically, the microprocessor 30, which is in communication with the VPS 16 during the passage of the call parameters, monitors the loop portion 28 for the invalidity signal. If the invalidity signal is received, the microprocessor 30 controls the loop control circuit 41 to maintain the line split condition and effect the on-hook condition with respect to the loop portion 28. The on-hook condition causes the CO switch 14 to transmit the preset collect voltage to the loop 22 but this voltage does not reach the pay station 11 because of the line split maintained by the loop control circuit 41. The microprocessor 30 then goes off-hook with respect to the loop portion 28 and controls the loop control circuit 41 to effect the straight through connection. The CO switch 14 in response to this operation is set to provide the return voltage to the loop 22. The microprocessor 30 then applies the on-hook condition to the loop 22 and the return voltage passes to the telephone 11 returning the deposit to the caller.

When all call parameters are successfully passed, the YES path from the block 116 is effected. After the parameters have been successfully transmitted to the VPS 16, the VPS 16 transmits to the IPS 25 a predetermined signal which may, for example, comprise a two character DTMF tone sequence. In the preferred embodiment of the invention, successful transmission of parameters is denoted by "CC" tones. Upon receipt of the CC tones, the IPS 25 immediately notifies the caller with the message record tone, cuts the caller through and does not further effect message services until a subsequent call is placed from the pay station 11 as denoted by the on-hook/off-hook sequence. Specifically, when the microprocessor 30 detects the CC tone, the microprocessor 30 transmits the message record tone to the station 11 and controls the loop control circuit 41 to effect the straight through connection (block 125).

Figure 1A:
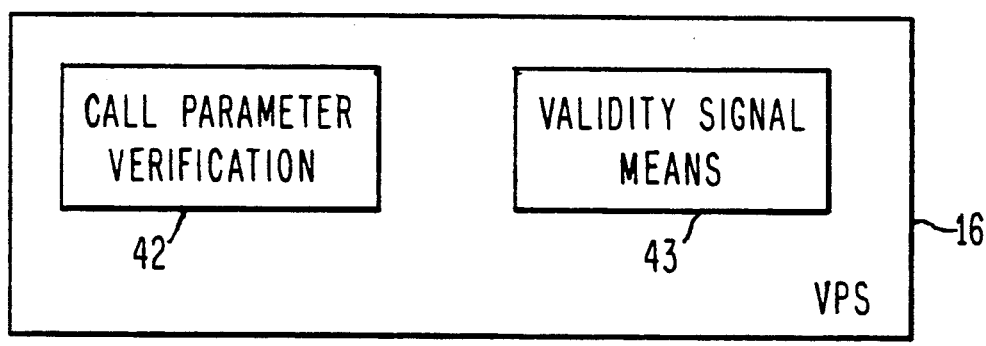
FIG. 1a is a schematic block diagram illustrating details of the Voice Processing Subsystem of FIG. 1.

FIG. 1a illustrates a call parameter verification block 42 in the VPS 16 for performing the described parameter verification function. A validity signal means block 43 within the VPS 16 issues the CC tone or the DD tone in accordance with whether the parameters passed or failed verification.

Pursuant to a block 118, at the sound of the message record tone, the caller leaves the message which is passed through the IPS 25 and the CO switch 14 to the VPS 16 for recording therein in a conventional manner. The calling station 11 then goes on-hook and in response thereto, the IPS 25 erases the stored call data from the memory 32. These operations are denoted by blocks 119 and 120. In accordance with a block 121, the CO switch 14 recognizes the on-hook signal passed through the IPS 25 from the calling station 11 and in response thereto, the CO switch 14 sends the coin collect voltage to the calling station 11 through the IPS 25. Blocks 121 and 122 depict these operations. Pursuant to a block 123, the coinage is transferred to the coin vault from the escrow chamber of the station 11 in response to the coin collect voltage. Thereafter, in the manner of conventional voice store and forward practice, the VPS 16 endeavors to deliver the voice message to the called station 20 as depicted by a block 124.

Figure 6:
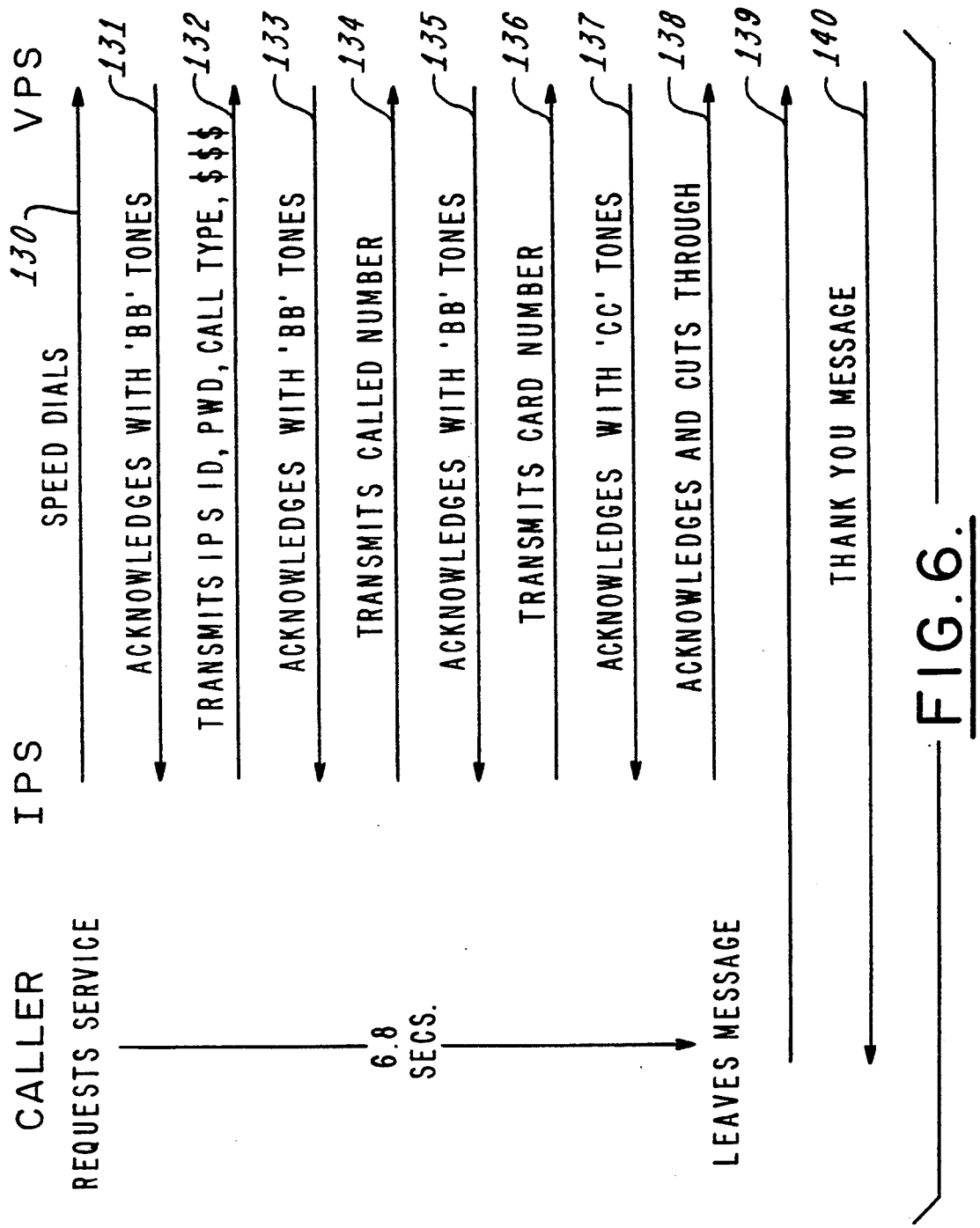
FIG. 6 is a chart of the Interface protocol between the IPS and the VPS.

Referring to FIG. 6, the IPS-VPS interface protocol for the call parameter passing dialog between the IPS 25 and the VPS 16 is illustrated. When the caller requests service, the IPS 25 speed dials the VPS 16 as designated by an arrow 130. The VPS 16 acknowledges with "BB" tones as denoted by an arrow 131. The IPS 25 then passes a first set of call parameters to the VPS 16 as denoted by an arrow 132. The first set of transmitted parameters comprises the IPS identification, the password, the call type and the amount of deposit. If one or more of these parameters are detected by the VPS 16 as being invalid, "DD" tones are transmitted to the IPS 25. If the parameters are valid, "BB" tones are transmitted. The acknowledgement of receipt of this group of parameters is denoted by an arrow 133. After acknowledgement of the group of parameters denoted by the arrow 132, the IPS 25 transmits the called telephone number to the VPS 16 as indicated by an arrow 134 and the VPS 16 acknowledges receipt thereof with "BB" tones as indicated by an arrow 135. The called number is a second set of call parameters transmitted to the VPS. A third set of parameters comprises the card number transmitted by the IPS 25 to the VPS 16 as indicated by an arrow 136. The acknowledgement of receipt of all of the parameters is effected by "CC" tones transmitted from the VPS 16 to the IPS 25 as indicated by an arrow 137. It is appreciated that at any point in the protocol, if an invalid action is attempted, the VPS 16 will respond to the IPS 25 with "DD" tones and the orderly disconnect routine 117 of FIG. 5 is effected. After successful transfer of the call parameters, the IPS 25 acknowledges by cutting the caller through to the VPS 16 as indicated by an arrow 138. The caller leaves the message at the VPS 16 (arrow 139) and the VPS 16 optionally sends a Thank You message (arrow 140) back to the caller before the caller goes on-hook.

Although the protocol of FIG. 6 was described in terms of the IPS 25 passing three sets of parameters to the VPS 16, it is appreciated that different arrangements of the call parameter transmission may be effected. For example, the first two sets may be combined into one set with only one acknowledgement transmitted thereafter. The card number is then sent separately as a second set.

It is appreciated from the foregoing that when the IPS 25 is an IPS-S unit, standard telephone company network call rating and billing capability is employed for both sent paid and non-sent paid conditions utilizing, for example, the switch translation tables and/or TSPS/TOPS. When the IPS 25 comprises an IPS-C, the unit controls coin deposits for sent paid message service and bypasses TSPS/TOPS on non-sent paid message service. It is appreciated, however, that the IPS-S and IPS-C units interface to the VPS 16 in an identical manner rendering the deployment choice transparent.

With respect to the call parameter transfer communication between the IPS 25 and the VPS 16, it is appreciated that conventional modem technology is utilized to effect the speed dialing, data transfers and acknowledgement transfers.

It is appreciated from the foregoing that the present invention provides voice messaging services for existing deployed pay phone devices without pay station retrofit. The present invention interfaces to all types of existing CO switches and is not dependent on particular switch configurations. The present invention utilizes a high degree of concurrency unlike prior art systems where operations are sequentially performed. The present invention maintains the connection to the called telephone until the caller accepts the voice messaging service. Prior art systems release the connection prior to acceptance of service. The present invention inquires if the caller desires the service immediately upon detecting the busy/RNA condition. The system of said U.S. Pat. No. 4,766,604 performs a substantial portion of the protocol thereof before offering the service thereby wasting a significant amount of traffic time. The invention returns the caller's deposit unless the call or voice messaging service request is completed. In prior systems, the deposit is not returned even though an invalid condition exists and the voice messaging service request cannot be entered into the system. The above-described embodiment of the invention was explained in terms of the calling station going on-hook after leaving the voice message at the VPS 16. It is appreciated that, alternatively, an entered key character, such as "#" or a time out may be utilized to signal the IPS 25 that the caller has completed entry of the request for service into the system.

The present invention was exemplified with respect to FIG. 1 by a telephone call placed from a pay station 11 to a called station 20 through the pay telephone serving CO 10 and the distant end CO 18. It is appreciated that the invention is also applicable to telephone calls placed between telephone stations served by the same CO as well as to telephone calls placed between stations served by different COs.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A voice message service method available to a caller at a calling station for storing and delivering voice messages from the caller over a telephone system having a plurality of telephone stations serviced by central office means, said calling station being one of said telephone stations, said central office means including central office switch means, each said telephone station being coupled to said central office switch means via a line connection, comprising the steps of:

entering at the calling station, a called telephone number identifying a called station, transmitting the called telephone number from the calling station to the central office switch means via said line connection through an Intercept Processing Subsystem remote from the telephone stations to initiate a call to the called station, storing the called telephone number in the Intercept Processing Subsystem, evaluating whether the called station remains on-hook for a predetermined number of ring tones or a busy signal has occurred, if the called station remains on-hook for the predetermined number of ring tones or the busy signal has occurred, determining if the caller desires to accept and has accepted the voice message service, splitting the line connection from calling station to the central office switch means at the Intercept Processing Subsystem only if and after the caller has accepted the voice message service, dialing a Voice Processing Subsystem from the Intercept Processing Subsystem after splitting the line connection, if the Intercept Processing Subsystem connects with the Voice Processing Subsystem, transmitting call parameters, including the stored called telephone number, from the Intercept Processing Subsystem to the Voice Processing Subsystem, re-establishing the line connection between the calling station and central office switch means, and passing a voice message from the caller at the calling station through the Intercept Processing Subsystem to the Voice Processing Subsystem for recording thereat for subsequent delivery to the called station.

2. The method of claim 1 further comprising the step of:

while transmitting the call parameters, sending a voice prompt from the Intercept Processing Subsystem to the calling station for the caller to record the voice message.

3. The method of claim 1 wherein the determining step comprises the steps of:

superimposing a voice announcement on the line connection to the calling station offering the voice message service to the caller prior to said splitting step, and monitoring the line connection by the Intercept Processing Subsystem for a service acceptance signal from the caller.

4. The method of claim 3 wherein the determining step further includes the step of:

reducing the volume on the line connection of the ring tones or busy signal simultaneously with performing the step of superimposing the service offering announcement.

5. The method of claim 1 wherein the dialing step comprises:

speed dialing the Voice Processing Subsystem from the Intercept Processing Subsystem.

6. The method of claim 1 wherein the Voice Processing Subsystem has a sent paid telephone number and a non-sent paid telephone number and wherein the dialing step comprises:

speed dialing the sent paid telephone number for sent paid telephone calls, or speed dialing the non-sent paid telephone number for non-sent paid telephone calls.

7. The method of claim 5 wherein the dialing step further includes the following steps if the Intercept Processing Subsystem does not connect with the Voice Processing Subsystem:

sending a voice announcement from the Intercept Processing Subsystem to the calling station that the acceptance of service cannot be processed, and re-establishing the line connection from the central office switch means to the calling station through the Intercept Processing Subsystem so that return voltage from the central office switch means passes through to the calling station in response to the caller placing the calling telephone on-hook.

8. The method of claim 1 wherein the transmitting parameters step further includes the steps of:

verifying the call parameters at the Voice Processing Subsystem, and if the call parameters pass verification, acknowledging the validity of the call parameters by transmitting a validity signal from the Voice Processing Subsystem to the Intercept Processing Subsystem.

9. The method of claim 8 wherein the transmitting parameters step further includes the following steps if a call parameter fails verification during the verifying step:

applying an on-hook condition by the Intercept Processing Subsystem to the central office switch means while the line connection is split at the Intercept Processing Subsystem so as to prevent collect voltage from reaching the calling station, re-establishing the line connection from the central office switch means to the calling station through the Intercept Processing Subsystem, applying an off-hook condition to the line connection by the Intercept Processing Subsystem, and applying an on-hook condition to the line connection by the Intercept Processing Subsystem so that the central office switch means transmits return voltage to the calling telephone.

10. The method of claim 1 wherein the transmitting parameters step includes:

transmitting identification signals from the Intercept Processing Subsystem to the Voice Processing Subsystem.

11. The method of claim 10 wherein the transmitting parameters step further includes the steps of:

verifying the identification signals at the Voice Processing Subsystem, and if the identification signals pass verification, acknowledging validity by transmitting a validity signal from the Voice Processing Subsystem to the Intercept Processing Subsystem so as to permit said voice message service to be provided to said caller.

12. The method of claim 11 wherein said identification signals comprise an identification number of the Intercept Processing Subsystem and a password.

13. The method of claim 1 wherein the splitting step comprises the step of splitting the line connection by the Intercept Processing Subsystem into a first line connection portion from the calling telephone to the Intercept Processing Subsystem and a second line connection portion from the Intercept Processing Subsystem to the central office switch means, said method comprising:

simultaneously effecting communication between the Intercept Processing Subsystem and the calling telephone station over the first line connection portion and between the Intercept Processing Subsystem and the central office switch means over the second line connection portion.

14. The method of claim 13 wherein said simultaneously effecting communication step comprises simultaneously sending a voice announcement from said Intercept Processing Subsystem to said calling telephone station instructing said caller to deposit a message while performing said transmitting call parameters step.

15. The method of claim 1 wherein said telephone stations comprise pay telephone stations and said central office means includes a pay telephone serving central office, wherein said Intercept Processing Subsystem is located at said pay telephone serving central office.

16. The method of claim 15 wherein said

Voice Processing Subsystem is located at the pay telephone serving central office.

17. An Intercept Processing Subsystem for use in the method of claim 1, said Intercept Processing Subsystem being remotely located with respect to said telephone stations, comprising:

loop control means interposed in said line connection from said calling station to said central office switch means, said loop means operative to switchably split and establish said line connection between said calling station and said central office switch means, thereby splitting said line connection into a first line connection portion from said calling telephone to said loop control means and a second line connection portion from said loop control means to said central office switch means, and processor means including memory means for storing said called number, said processor means operative to control said loop control means to split and establish said line connection and, while said line connection is split, to simultaneously effect communication with said calling station and said central office switch means over said first and second line connection portions, respectively.

18. The Intercept Processing Subsystem of claim 17 wherein:
    said loop control means is constructed and arranged to couple signals existing on said line connection to said processor means, and
    said processor means is operative, with said line connection established, to evaluate whether said predetermined number of ring tones or said busy signal has occurred, to monitor for a service acceptance signal from said caller when said predetermined number of ring tones or said busy signal has occurred and to control said loop control means to split said line connection from said calling station to said central office switch means when said caller accepts said voice message service.

19. The Intercept Processing Subsystem of claim 18 further comprising:
    means for dialing said Voice Processing Subsystem, and
    voice chip means for providing voice prompts and announcements,
    said processor means being operative, with said line connection split, to transmit said call parameters to said Voice Processing Subsystem, via said second line connection portion, and simultaneously to send a voice prompt to said calling station, via said first line connection portion, for said caller to record a voice message,
    said processor means being operative, after transmitting said call parameters and sending said voice prompt, to control said loop control means to re-establish said line connection between said calling station and said central office switch means for passing said voice message from said caller at said calling station to said Voice Processing Subsystem for recording thereat for subsequent delivery to said called station.

20. The Intercept Processing Subsystem of claim 19 wherein said dialing means comprises speed dialing means.

21. The Intercept Processing Subsystem of claim 20 wherein:
    said processor means is operative, when said line connection is split and said dialing means does not connect with said Voice Processing Subsystem, to send a voice announcement, via said first line connection portion, to said calling station that the acceptance of service cannot be processed, and
    said processor means is further operative to control said loop control means to re-establish said line connection from said central office switch means to said calling station, whereby return voltage from said central office switch means passes through to said calling station in response to said caller placing said calling station on-hook.

22. The Intercept Processing Subsystem of claim 19 further including blocking tables, stored in said memory means, of telephone numbers precluded from being accessed by said voice message service.

23. The Intercept Processing Subsystem of claim 19 wherein said telephone stations comprise pay telephone stations and said central office means includes a pay telephone serving central office, said Intercept Processing Subsystem being located at said pay telephone serving central office.

24. The Intercept Processing Subsystem of claim 23 wherein said Voice Processing Subsystem is located at said pay telephone serving central office.

25. The Intercept Processing Subsystem of claim 19 wherein said processor means is operative, with said line connection established, to superimpose on said line connection via said loop control means, a voice announcement to said calling station offering said voice message service to said caller and to monitor said line connection for said service acceptance signal from said caller.

26. The Intercept Processing Subsystem of claim 25 wherein:
    said loop control means is constructed and arranged to reduce the volume on said line connection, and
    said processor means is operative to control said loop control means to reduce the volume on said line connection of said ring tones or busy signal while superimposing said service offering announcement.

27. The Intercept Processing Subsystem of claim 19 wherein said Voice Processing Subsystem includes means for verifying said parameters of said call and transmitting a validity signal to said Intercept Processing Subsystem in accordance therewith,
    said processor means being operative to acknowledge validity of said parameters of said call in accordance with said validity signal.

28. The Intercept Processing Subsystem of claim 27 wherein:
    said loop control means is constructed and arranged to effect on-hook and off-hook conditions with respect to said line connection,
    said processor means is operative, if a call parameter fails verification, to control said loop control means to apply a first on-hook condition/an off-hook condition/a second on-hook condition sequence to said line connection,
    said first on-hook condition being applied to said central office switch means while said line connection is split, thereby preventing collect voltage from reaching said calling station, and
    said processor means is further operative to control said loop control means to re-establish said line connection from said central office switch means to said calling station during said off-hook condition and said second on-hook condition,
    said second on-hook condition being applied to said line connection whereby said central office switch means transmits return voltage to said calling station.

29. The Intercept Processing Subsystem of claim 28 wherein said processor means is operative, when transmitting said call parameters to said Voice Processing Subsystem, to transmit identification signals to said Voice Processing Subsystem.

30. The Intercept Processing Subsystem of claim 29 wherein said Voice Processing Subsystem includes means for verifying said identification signals and transmitting a validity signal to said Intercept Processing Subsystem in accordance therewith,
    said processor means being operative to acknowledge validity of said identification signals in accordance with said validity signal, thereby permitting said voice message service to be provided to said caller.

31. The Intercept Processing Subsystem of claim 30 wherein said identification signals comprise an identification number of said Intercept Processing Subsystem and a password.

32. The Intercept Processing Subsystem of claim 31 wherein said processor means is operative, when transmitting said call parameters to said Voice Processing Subsystem, to transmit said called telephone number stored in said memory means to said Voice Processing Subsystem.

33. The Intercept Processing Subsystem of claim 19 wherein said processor means is operative to control said loop control means to establish said line connection between said calling station and said central office switch means and to send voice announcements from said voice chip means to said calling station via said line connection.

34. The Intercept Processing Subsystem of claim 19 wherein said processor means is operative to control said loop control means to split said line connection between said calling station and said central office switch means and to send voice announcements from said voice chip means to said calling station via said first line connection portion.

* * * * *